United States Patent [19]

Molitor

[11] Patent Number: 4,726,590
[45] Date of Patent: Feb. 23, 1988

[54] HIGH COEFFICIENT GOLF BALL CORE

[75] Inventor: Robert P. Molitor, Niles, Mich.

[73] Assignee: Spalding & Evenflo Companies, Inc., Chicopee, Mass.

[21] Appl. No.: 859,069

[22] Filed: May 2, 1986

Related U.S. Application Data

[63] Continuation-in-part of Ser. No. 680,088, Dec. 10, 1984, abandoned.

[51] Int. Cl.$^4$ .......................... A63B 37/02; C08F 8/30
[52] U.S. Cl. ...................................... 273/220; 273/218; 273/230; 525/123; 525/126
[58] Field of Search ................. 525/123, 126; 273/230, 273/235 R, 218, DIG. 22

[56] References Cited

U.S. PATENT DOCUMENTS

| | | |
|---|---|---|
| 3,084,141 | 4/1963 | Kraus et al. . |
| 3,203,944 | 8/1965 | Hsieh . |
| 3,332,917 | 7/1967 | Hsieh . |
| 3,467,628 | 9/1969 | Thurn . |
| 3,531,429 | 9/1970 | Schmidt et al. . |
| 3,640,990 | 2/1972 | Naylor . |
| 3,692,719 | 9/1972 | Srail et al. . |
| 3,882,089 | 5/1975 | Baker et al. . |
| 3,909,466 | 9/1975 | Matsui et al. . |
| 3,932,353 | 1/1976 | Mastrolia et al. . |
| 4,068,849 | 1/1978 | DiSalvo et al. . |
| 4,070,344 | 1/1978 | Hergenrother et al. . |
| 4,091,195 | 5/1978 | Vitek . |
| 4,165,877 | 8/1979 | Miller et al. . |
| 4,169,599 | 10/1979 | Fujio et al. . |
| 4,239,860 | 12/1980 | Herenrother et al. . |
| 4,264,075 | 4/1981 | Miller et al. . |

FOREIGN PATENT DOCUMENTS

| | | |
|---|---|---|
| 1037091 | 7/1966 | United Kingdom . |
| 1148529 | 4/1969 | United Kingdom . |
| 1163662 | 9/1969 | United Kingdom . |
| 1177224 | 1/1970 | United Kingdom . |
| 1177225 | 1/1970 | United Kingdom . |
| 1177226 | 1/1970 | United Kingdom . |
| 1209032 | 10/1970 | United Kingdom . |
| 1265596 | 3/1972 | United Kingdom . |
| 1312816 | 4/1973 | United Kingdom . |
| 1349858 | 4/1974 | United Kingdom . |
| 1355956 | 6/1974 | United Kingdom . |

Primary Examiner—John C. Bleutge
Assistant Examiner—A. Carrillo
Attorney, Agent, or Firm—Lahive & Cockfield

[57] ABSTRACT

Disclosed is a composition for manufacturing one-piece golf ball cores having improved coefficient of restitutions. The composition comprises an elastomer crosslinkable with a free radical initiator catalyst, a metal salt of an alpha, beta, ethylinically unsaturated monocarboxylic acid such as zinc di or mono acrylate or methacrylate, a free radical initiator catalyst, and a polyfunctional isocyanate, preferably a diisocyanate such as 4,4' diphenylmethane diisocyanate, or a polymer thereof.

12 Claims, No Drawings

HIGH COEFFICIENT GOLF BALL CORE

REFERENCE TO RELATED APPLICATION

This application is a continuation-in-part of copending U.S. application Ser. No. 680,088 filed Dec. 10, 1984, now abandoned.

BACKGROUND

This invention relates to an improved solid core for a golf ball, golf balls made with the new cores, and a composition of matter suitable for molding such cores.

Two-piece golf balls consisting of a molded resilient core and a cover are now widely available. They consist of a peroxide cross-linked, mixed polybutadiene-metal acrylate molded core and a separately molded cover typically comprising an ionomer resin such as the type sold by E. I. Dupont de Nemours Company under the trademark SURLYN. The balls are extremely popular because they can be manufactured to be substantially cutproof and to travel further when hit than any other type of commercially available USGA regulation golf ball.

The distance a ball will travel when hit (hereinafter "distance") is a function of many factors including angle of trajectory and clubhead speed. Among the factors of concern to manufacturers which affect distance are the coefficient of restitution of the ball, and the ball's surface configuration, i.e., dimple pattern. Coefficient of restitution is a measurement familiar to those skilled in the golf ball art. One way to measure the coefficient is to propel a ball at a given speed against a hard massive surface, and measure its incoming and outgoing velocity electronically. The coefficient of restitution is the ratio of the outgoing velocity to incoming velocity.

The coefficient of restitution in solid core balls is a function of the composition of the molded core and of the cover. In so-called three-piece balls comprising a liquid or solid center, elastic thread windings, and a cover, the coefficient of the core is a function primarily of the composition of the elastomeric thread windings and center, and the winding tension.

Those seeking to increase the coefficient of restitution of golf balls are restrained effectively by the U.S. Golfers Association regulations which mandate that a "regulation" ball cannot have an initial velocity in excess of 255 feet per second. All other things being equal, as the coefficient of restitution of a ball is increased, the ball's initial velocity will also increase.

U.S. Pat. No. 3,819,768 to R. P. Molitor discloses that the coefficient of restitution of golf balls having any given core can be increased significantly by applying to the core a cover material comprising a blend of a sodium neutralized ionomer resin with a zinc neutralized ionomer resin. Over the years, distance in two-piece golf balls has been steadily improved by virtue of the development of embodiments of the Molitor invention which give further increases in coefficient and the development of improved molded cores.

Cores suitable for use in manufacturing two-piece balls are disclosed in U.S. Pat. Nos. 4,264,075, 4,169,599, 4,165,877, and 4,141,559. Currently, it is believed that the highest coefficient molded cores comprise a high cis content polybutadiene and a zinc salt of an alpha beta ethylinically unsaturated monocarboxylic acid, e.g., zinc di or mono acrylate or methacrylate, cured with conventional free radical initiator-type peroxide catalysts.

SUMMARY OF THE INVENTION

It has now been discovered that the addition of small amounts of polyfunctional monomeric or polymeric isocyanates, preferably diisocyanates, or mixtures thereof, to what otherwise may be a conventional core composition of the type described above can have the effect of significantly increasing the coefficient of restitution of the resulting cores. Specifically, compositions of the invention containing a polyfunctional isocyanate can be used to make golf ball cores having an increased coefficient of restitution relative to identical cores made in the absence of the isocyanate. In accordance with the invention, cores having a coefficient in excess of 0.780 can be made. An average coefficient for cores from production lots of 0.803±0.005 measured with an incoming velocity of 125 ft./sec., can be achieved. This permits the golf ball manufacturer to approach more closely the USGA initial velocity limit even without the increase in the coefficient that can be obtained using the cover composition disclosed in the above-referenced Molitor patent.

The invention comprises a golf ball having a cover and a core, and a composition for manufacturing the core. The composition comprises an elastomer which can be cross-linked by free radical initiator or other types of catalysts, preferably a high cis content polybutadiene elastomer, a metal salt of an alpha, beta, ethylinically unsaturated monocarboxylic acid compound, a free radical initiator catalyst for cross-linking the elastomer and the monocarboxylic acid compound, and a polyfunctional isocyanate. The invention includes cores comprising the product of reaction of these components having a coefficient of at least 0.750. Preferably, the monocarboxylic acid compound is zinc diacrylate, zinc dimethacrylate, zinc monoacrylate, or zinc monomethacrylate; the catalyst comprises a conventional rubber curing peroxide compound, preferably n butyl 4,4' bis (butyl peroxy valerate), dicumyl peroxide, 1,1-bis (t-butyl peroxy) 3,3,5-trimethyhlcyclohexane, di-t-butyl peroxide, or 2,5 di (t-butyl peroxy)-2,5 dimethylhexane. The preferred polyfunctional isocyanates are diisocyanates, most preferably 4,4' diphenylmethane diisocyanate in admixture with low polymers thereof. However, other reactive, relatively low molecular weight compounds having 2 or more isocyanate groups may be used. The preferred polyfunctional isocyanates are liquids having a relatively low vapor pressure. Liquids are preferred as they are more easily dispersed uniformly in the core composition. Lower vapor pressure materials present fewer safety hazards to personnel. In addition, the composition and golf ball core of the invention may comprise a low molecular weight fatty acid such as stearic acid.

In general, the golf ball core and the composition of the invention can comprise 100 parts of polybutadiene, 20-50 parts carboxylic acid salt, 0-20 parts fatty acid, 1-10 parts peroxide, and 0.2-5 parts isocyanate. The amount of isocyanate that must be present to achieve the unexpected increase in coefficient will vary, depending on the particular isocyanate selected, and should be determined empirically for each composition. The foregoing range has been determined for cores employing 4,4' diphenyl methane diisocyanate. Only a small increase is observed at the lowest end of the range, and as the isocyanate content is increased above 5 parts, the observed increase in coefficient begins to diminish.

The core may also include some inorganic filler such as zinc oxide or barytes to increase its specific gravity. At least a small amount of zinc oxide is preferably used as it seems to have the effect of increasing coefficient. A preferred composition comprises 100 parts polybutadiene, 36 parts monocarboxylic acid zinc salt such as zinc diacrylate, 5 parts low molecular weight fatty acid, 2 parts peroxide, e.g., dicumyl peroxide or n butyl 4,4′ bis (butyl peroxy) valerate, and about 1 part of a diisocyanate, e.g., 4,4′ diphenylmethane diisocyanate.

Accordingly, it is an object of the invention to provide an elastomer composition useful in making cores for two-piece balls having a higher coefficient of restitution. Another object is to provide a golf ball having a cover and a core which, because of the composition of the core, has improved distance. Still another object is to provide a core for a two-piece golf ball, which core may be used together with relatively low resilience cover materials while still achieving a ball coefficient of restitution and associated initial velocity closely approaching the USGA limit.

These and other objects and features of the invention will be apparent from the following description and from the claims.

DESCRIPTION

Except for the addition of the polyfunctional isocyanate, the core composition and spherical golf ball core of the invention are manufactured using conventional techniques. Thus, an elastomer, preferably a polybutadiene elastomer comprising as much cis polybutadiene as possible, is blended together with (1) an alpha, beta, ethylinically unsaturated metal salt such as zinc mono or di acrylate or methacrylate, or various mixtures thereof, (2) optionally a relatively inert higher specific gravity filler such as zinc oxide to increase the weight of the core, (3) optionally a low molecular weight fatty acid having, for example, 10-40 carbon atoms, e.g., stearic acid, (4) a free radical initiator catalyst such as a peroxide, and (5) the polyfunctional isocyanate.

Preferably, all ingredients except the peroxide and the isocyanate are mixed and blended using conventional mixing equipment and the peroxide and isocyanate are added while the temperature of the mixture is on the order of 200° F. The blend is extruded to form slugs of a weight slightly greater than the weight of the cores to be produced, and then the slugs are compression molded to cure the composition.

The slugs are placed in the cavities of a two-part mold, which is closed to compress the elastomer composition, and then heated, for example, to over 295° F. After curing the cores for 10 to 20 minutes, depending on the molding temperature, the mold is opened and the flashing is removed. A thin surface layer of the cores is then ground off to produce a core of the size required. The flash removed from the core may be ground to a fine particle size and added to a new batch of the core composition.

While the reaction which takes place is not well understood, it is believed that a complex network of cross-links between the unsaturated components of the blend are formed. Also, a small amount of zinc oxide may react in some way. Isocyanate groups, of course, react primarily with amine or hydroxyl group. However, they are known to be reactive with carboxylic acids with liberation of carbon dioxide. While it may be that some trace of free carboxylic acid is present in the blend as an impurity in association with the metal carboxylic acid salt or ester, no gas liberation has been observed during the curing process, and no theoretical explanation for the beneficial effects of the isocyanate is available.

Optionally, the core may be dipped in a solution of an adhesive, e.g., an epoxy-based adhesive, prior to injection or compression molding a cover.

The covers molded about the cores can comprise balata or blends of balata with other elastomeric or thermoplastic materials, various ionomers of the type known to those skilled in the art or blends thereof, and various resilient compositions such as are disclosed in U.S. Pat. Nos. 3,359,231, 4,398,000, 4,234,184, 4,295,652, 4,248,432, 3,989,516, 3,310,102, 4,337,947, 4,123,061, and 3,490,146. If it is desired to further increase the coefficient of restitution of the golf ball, a cover embodying the invention disclosed in U.S. Pat. No. 3,819,768 may be used. The currently preferred cover for use on the golf ball imparts to the ball short iron and other playability characteristics comparable to balata-covered wound balls. The cover is disclosed in detail in copending U.S. application Ser. No. 680,087, the disclosure of which is incorporated herein by reference. Briefly, this new cover comprises a blend of a thermoplastic urethane having a Shore A hardness less than 95 and a ionomer material such as those disclosed in U.S. Pat. No. 3,264,272 and sold by E. I. Dupont de Nemours Company under the trademark SURLYN having a Shore D hardness greater than 55 at a weight ratio sufficient to produce a cover having a Shore C hardness within the range of 70 to 85.

The currently preferred polyfunctional isocyanates for use in the core composition and core of the invention are diisocyanates, most preferably 4,4′ diphenylmethane diisocyanate. However, other reactive isocyanates having at least two isocyanate groups may be used. Examples include monomeric diisocyanates such as trimethylene diisocyanate, propylene-1,2 diisocyanate, tetramethylene diisocyanate, butylene-1,3 diisocyanate, decamethylene diisocyanate, octadecamethylene diisocyanate, 1 propylene-1,2-diisocyanate, 3-butylene-1,2 diisocyanate, 1-butylene 1,3 diisocyanate, 1-butylene-2,3 diisocyanate, ethylidene diisocyanate, propylidene-1,1-diisocyanate, propylidene 2,2-diisocyanate, cyclopentylene-1,3 diisocyanate, cyclohexylene-1,3 diisocyanate, cyclohexylene 1,2-diisocyanate, cyclohexylene-1,4-diisocyanate, cyclopentylidene diisocyanate, cyclohexylidene diisocyanate, m-phenylene diisocyanate, o phenylene diisocyanate, p-phenylene diisocyanate, 1 methyl-2,4 phenylene diisocyanate, naphthalene-1,4- diisocyanate, diphenylene-4,4′ diisocyanate, 3,4 tolylene diisocyanate, 2,6-tolylene diisocyanate, 1,5 naphthalene diisocyanate, 2,2-methylene-bis (4-phenylisocyanates)2,2, propylene-bis-(4-phenylisocyanate), xylylene 1,4 diisocyanate, xylylene 4,6 diisocyanate, and 4,4′ diphenylene methane diisocyanate. Polymeric polyfunctional isocyanates, mixtures of low polymeric and monomeric diisocyanates, and monomeric polyfunctional isocyanates may also be used. Examples of the former type of isocyanate cross-linker include various polymethylene polyphenyl isocyanates having a molecular weigt within the range of 340 to 380 or higher. Examples of the latter type include polyfunctional aliphatic isocyanates.

The amount of a particular polyfunctional isocyanate which maximizes the coefficient of a particular composition should be determined empirically. Generally, 0.1 to 10 parts per 100 parts polybutadiene or other elastomer may be used, depending on the isocyanate employed and on the identity of other components. Suitable isocyanates for use in formulation golf ball cores of the invention are available commercially from, for example, Mobay Chemical Corporation or The Upjohn Company.

The currently preferred free radical initiator catalyst is a peroxide, most preferably n butyl 4,4' bis (butyl peroxy) valerate. Other conventional rubber curing peroxides may be used. Not limiting examples include dicumyl peroxide, 1,1-bis (t-butyl peroxy)-3,3,5-trimethylcyclohexane, di-t-butyl peroxide, and 2,5 di (t-butylperoxy)-2,5-dimethyl hexane.

The cross-linkable elastomer, unsaturated carboxylic acid metal salt, free radical initiator catalyst, and a polyfunctional isocyanate are all necessary to achieve the increased coefficient of cores of the invention. However, other materials may be included in the core. For example, low molecular weight fatty acids such as stearic acid appear to have beneficial effects. High specific gravity fillers such as barium sulfate, lead oxide, or most preferably zinc oxide may be added to the core to increase the weight of the ball as desirable or as necessary to have the ball reach or closely approach the USGA weight limit of 1.620 ounce. In addition, small amounts of ionomers of the type described previously, natural or synthetic rubbers, and other compatible elastomers may be used as diluents. Also, coagents useful in peroxide curing may be used, e.g., N N' m-phenylene dimaleimide.

Broadly, in preferred compositions, for each 100 parts polybutadiene, the core composition of the invention can include 20–50 parts carboxylic acid salt, 1–20 parts low molecular weight fatty acid, 1–10 parts peroxide, and 0.01–10 preferably 0.2–5 parts of the polyfunctional isocyanate. The ratios of ingredients may vary and are best optimized empirically. The amount of polyvalent isocyanate used will vary depending on the particular monocarboxylic acid, peroxide, and elastomer employed, and the relative amounts used.

The invention will be further understood from the following non-limiting examples:

EXAMPLE 1

Using the ingredients set forth below, golf ball cores having a finished size of 1.545 inch were manufactured by compression molding and then grinding a surface layer off the molded cores. Each core was formulated using 100 parts high cis content polybutadiene, 5 parts zinc oxide, and 17.4 parts ground flash. The amounts of the remaining ingredients used in the test cores (in parts by weight) and the coefficient of restitution and Riehle compression of the cores are set forth below:

TABLE 1

Effect of Polyfunctional Isocyanate On Golf Ball Core Coefficient

| Ingredient | 1 | 1A | 2 | 2A | 3 | 3A | 4 | 4A |
|---|---|---|---|---|---|---|---|---|
| Stearic Acid | 3.0 | 3.0 | 3.0 | 3.0 | 7.0 | 7.0 | 7.0 | 7.0 |
| Zinc Diacrylate | 38 | 38 | 38 | 38 | 38 | 38 | 38 | 38 |
| Dicumyl Peroxide | 3.0 | 3.0 | 4.0 | 4.0 | 3.0 | 3.0 | 4.0 | 4.0 |
| Barium Sulfate | 14.3 | 14.3 | 14.3 | 14.3 | 14.3 | 14.3 | 14.3 | 14.3 |
| Diisocyanate | 0 | 1.0 | 0 | 1.0 | 0 | 1.0 | 0 | 1.0 |
| Compression | 61 | 56 | 58 | 57 | 55 | 51 | 55 | 51 |
| Coefficient | .807 | .811 | .809 | .809 | .812 | .815 | .806 | .808 |

| Ingredient | 5 | 5A | 6 | 6A | 7 | 7A | 8 | 8A |
|---|---|---|---|---|---|---|---|---|
| Stearic Acid | 3.0 | 3.0 | 3.0 | 3.0 | 7.0 | 7.0 | 7.0 | 7.0 |
| Zinc Diacrylate | 43 | 43 | 43 | 43 | 43 | 43 | 43 | 43 |
| Dicumyl Peroxide | 3.0 | 3.0 | 4.0 | 4.0 | 3.0 | 3.0 | 4.0 | 4.0 |
| Barium Sulfate | 11.3 | 11.3 | 11.3 | 11.3 | 11.3 | 11.3 | 11.3 | 11.3 |
| Diisocyanate | 0 | 1.0 | 0 | 1.0 | 0 | 1.0 | 0 | 1.0 |
| Compression | 53 | 49 | 52 | 48 | 50 | 46 | 47 | 47 |
| Coefficient | .808 | .813 | .805 | .807 | .811 | .815 | .808 | .811 |

As can be seen from the foregoing table, the inclusion of 1 part (1% based on weight of polybutadiene) polyfunctional isocyanate (4,4' diphenyl methane diisocyanate) generally has the effect of hardening the core (decreases compression values) and increasing coefficient.

EXAMPLE 2

Using the procedure of example 1, 18 additional exemplary golf ball cores were formulated while varying the amount of isocyanate employed, and the identity or amounts of other ingredients as set forth below. Table 2 illustrates the effect on coefficient and compression of varying the identity of the polyfunctional isocyanate, the acid salt, or the elastomer. Table 3 illustrates the effect of varying the isocyanate content employing 4,4' methylene diisocyanate. Two parts peroxide were used as a free radical initiator catalyst in all of the formulations unless otherwise indicated.

TABLE 2

| Ingredient | 1 | 2 | 3 | 4 | 5 | 6 | 7 | 8 | 9 | 10 | 11 | 12 | 13 |
|---|---|---|---|---|---|---|---|---|---|---|---|---|---|
| polybutadiene | 100 | 100 | 100 | 100 | 100 | 100 | 100 | 90 | 90 | 100 | 100 | 100 | 100 |
| zinc diacrylate | 27 | 27 | 27 | 27 | 27 | 27 | 27 | 27 | 27 | — | — | — | — |
| zinc oxide | 5 | 5 | 5 | 5 | 5 | 5 | 5 | 5 | 5 | 10 | 10 | — | — |
| stearic acid | 5 | 5 | 5 | 5 | 5 | 5 | 5 | 5 | 5 | — | — | — | — |
| ground flash | 16 | 16 | 16 | 16 | 16 | 16 | 16 | 16 | 16 | — | — | — | — |
| calcium carbonate | 21 | 21 | 21 | 21 | 21 | 21 | 21 | 21 | 21 | | | | |
| Peroxide catalyst | 2 | 2 | 2 | 2 | 2 | 2 | 2 | 2 | 2 | — | — | 7.2 | 7.2 |
| Natural rubber | — | — | — | — | — | — | — | 10 | 10 | — | — | — | — |
| 4'4' diphenyl methane diisocyanate | — | — | — | — | — | — | — | — | 1 | — | 1 | — | 1 |
| Papi 94* | — | 1 | — | — | — | — | — | — | — | — | — | — | — |
| Mondur MRS -10* | — | — | 1 | — | — | — | — | — | — | — | — | — | — |
| Papi 27* | — | — | — | 1 | — | — | — | — | — | — | — | — | — |
| Papi 580* | — | — | — | — | 1 | — | — | — | — | — | — | — | — |
| Papi 135* | — | — | — | — | — | 1 | — | — | — | — | — | — | — |
| Desmondur L -2291A* | — | — | — | — | — | — | 1 | — | — | — | — | — | — |
| Zinc monomethacrylate | — | — | — | — | — | — | — | — | — | — | — | 40 | 40 |
| barytes | — | — | — | — | — | — | — | — | — | 20 | 20 | — | — |
| trimethylol propanetrimethacrylate | — | — | — | — | — | — | — | — | — | 30 | 30 | — | — |

TABLE 2-continued

| Ingredient | 1 | 2 | 3 | 4 | 5 | 6 | 7 | 8 | 9 | 10 | 11 | 12 | 13 |
|---|---|---|---|---|---|---|---|---|---|---|---|---|---|
| Fumed silica | — | — | — | — | — | — | — | — | — | 33 | 33 | — | — |
| Weight | 38.2 | 38.1 | 38.2 | 38.3 | 38.1 | 38.3 | 38.3 | 38.0 | 38.1 | 40.8 | 40.4 | 36.4 | 36.5 |
| Compression | 60 | 58 | 51 | 57 | 58 | 55 | 59 | 64 | 60 | 88 | 119 | 73 | 77 |
| Coefficient | .787 | .790 | .790 | .791 | .791 | .789 | .789 | .772 | .778 | .729 | .697 | .740 | .750 |

TABLE 3

| | Sample Number | | | | | |
|---|---|---|---|---|---|---|
| Ingredient | C | 1 | 2 | 3 | 4 | 5 |
| Polybutadiene | 100 | 100 | 100 | 100 | 100 | 100 |
| Zinc diacrylate | 27 | 27 | 27 | 27 | 27 | 27 |
| Zinc oxide | 5 | 5 | 5 | 5 | 5 | 5 |
| Stearic acid | 5 | 5 | 5 | 5 | 5 | 5 |
| ground fash | 16 | 16 | 16 | 16 | 16 | 16 |
| calcium carbonate | 21 | 21 | 21 | 21 | 21 | 21 |
| 4,4' diphenyl methane diisocyanate | — | 0.1 | 1 | 2 | 5 | 10 |
| Weight | 38.2 | 38.1 | 38.3 | 38.4 | 38.4 | 38.5 |
| Compression | 60 | 59 | 58 | 52 | 53 | 115 |
| Coefficient | .787 | .786 | .791 | .791 | .792 | .733 |

As can be appreciated from a review of Table 2, the inclusion of a small amount of an isocyanate having two or more reactive groups uniformly increases the coefficient of the resulting cores except when a metal salt of the unsaturated monocarboxylic acid compound is replaced with an acrylate ester (compare sample Nos. 10 and 11). Table 3 illustrates a typical effect of altering the amount of isocyanate in the composition. If too little of the selected isocyanate is used, no increase in coefficient is observed. If too much is used, the coefficient of the golf ball core actually will decrease relative to cores formulated conventionally.

The currently preferred embodiment of the invention consists of the following ingredients in the following parts by weight:

| | |
|---|---|
| polybutadiene | 100 |
| zinc diacrylate | 34.6 |
| zinc oxide | 4.5 |
| stearic acid | 5 |
| ground flash | 29 |
| peroxide | 0.67 |
| Papi 94 | 0.45 |

The invention may be embodied in other specific forms without departing from the spirit and scope thereof. Accordingly, other embodiments are within the following claims.

What is claimed is:

1. A golf ball comprising a cover and a molded, spherical core, said core comprising the product of reaction of a mixture of at least:
   an elastomer cross-linkable by a free radical initiator catalyst;
   a zinc salt of an alpha, beta, ethylenically unsaturated monocarboxylic acid;
   a free radical initiator catalyst; and
   between about 0.10 and 10 parts per 100 parts of said elastomer of a compound consisting of a polyfunctional isocyanate, said isocyanate having at least two isocyanate groups and being present in an amount sufficient to increase the coefficient of restitution of said core relative to otherwise identical cores free of said isocyanate.

2. The ball of claim 1 wherein said elastomer comprises polybutadiene.

3. The ball of claim 1 wherein said monocarboxylic acid compound is selected from the group consisting of zinc diacrylate, zinc dimethacrylate, zinc monoacrylate, and zinc monomethacrylate.

4. The ball of claim 1 wherein said free radical initiator catalyst comprises a rubber curing peroxide compound.

5. The ball of claim 1 wherein said polyfunctional isocyanate is 4,4' diphenyl methane diisocyanate.

6. The ball of claim 1 wherein said polyfunctional isocyanate is a diisocyanate.

7. The ball of claim 6 wherein said diisocyanate is selected from the group consisting of trimethylene diisocyanate, propylene-1,2 diisocyanate, tetramethylene diisocyanate, butylene-1,3 diisocyanate, decamethylene diisocyanate, octadecamethylene diisocyanate, 1 propylene-1,2-diisocyanate, 3-butylene-1,2 diisocyanate, 1-butylene 1,3 diisocyanate, 1-butylene-2,3 diisocyanate, ethylidene diisocyanate, propylidene-1,1-diisocyanate, propylidene 2,2-diisocyanate, cyclopentylene-1,3 diisocyanate, cyclohexylene-1,3 diisocyanate, cyclohexylene 1,2-diisocyanate, cyclohexylene-1,4-diisocyanate, cyclopentylidene diisocyanate, cyclohexylidene diisocyanate, m-phenylene diisocyanate, o phenylene diisocyanate, p-phenylene diisocyanate, 1 methyl -2,4 phenylene diisocyanate, naphthalene-1,4- diisocyanate, diphenylene-4,4' diisocyanate, 3,4 tolylene diisocyanate, 2,6- tolylene diisocyanate, 4,4'diphenylmethane diisocyanate, 1,5 naphthalene diisocyanate, 2,2methylene-bis (4-phenylisocyanate), 2,2 proylene-bis-(4-phenylisocyanate), xylylene 1,4 diisocyanate, xylylene 4,6 diisocyanate, and mixtures thereof.

8. The ball of claim 1 further comprising a low molecular weight fatty acid.

9. The ball of claim 1 wherein said free radical initiator catalyst is a peroxide selected from the group consisting of n butyl 4,4' bis (butylperoxy) valerate, dicumyl peroxide, 1,1-bis (t-butylperoxy)-3,3,5-trimethylcyclohexane, di-t-butyl peroxide, and 2,5-di(t-butylperoxy)-2,5-dimethyl hexane.

10. The ball of claim 1 wherein said elastomer is polybutadiene, said monocarboxylic acid salt is zinc diacrylate, and said polyfunctional isocyanate is 4,4' diphenyl methane diisocyanate.

11. The ball of claim 1 wherein said polyfunctional isocyanate is a polymerized diisocyanate.

12. The ball of claim 1 wherein said polyfunctional isocyanate comprises more than two reactive isocyanate moieties.

* * * * *